United States Patent [19]
Ray

[11] Patent Number: 5,267,063
[45] Date of Patent: Nov. 30, 1993

[54] GRADIENT INDEX MIRROR FOR PROVIDING A COLLIMATED BEAM FOR LIQUID CRYSTAL DISPLAYS AND THE LIKE

[75] Inventor: Rajarshi Ray, Princeton, N.J.

[73] Assignee: AT&T Bell Laboratories, Murray Hill, N.J.

[21] Appl. No.: 908,105

[22] Filed: Jul. 2, 1992

[51] Int. Cl.$^5$ .............................. G02F 1/133
[52] U.S. Cl. ...................... 359/49; 359/38; 359/70; 359/94; 359/652
[58] Field of Search ............ 359/38, 40, 49, 70, 359/89, 94, 641, 652, 654, 93

[56] References Cited

U.S. PATENT DOCUMENTS

| | | | |
|---|---|---|---|
| 4,660,936 | 4/1987 | Nosker | 359/70 |
| 4,900,138 | 2/1990 | Atkinson, III et al. | 359/654 |
| 5,061,046 | 10/1991 | Lee et al. | 359/93 X |

FOREIGN PATENT DOCUMENTS 2194071 2/1988 United Kingdom ............ 359/38

OTHER PUBLICATIONS

Sony GV-9 Video Walkman Service Manual, pp. 22, 29, 1989.

Primary Examiner—William L. Sikes
Assistant Examiner—Huy K. Mai
Attorney, Agent, or Firm—Robert B. Levy

[57] ABSTRACT

The contrast of an LCD cell (12) is enhanced by the use of a gradient index plate mirror (16',16") positioned behind the cell to reflect light from a light source (14',14") through the cell in a well-collimated beam. The mirror (16',16") is formed of an optical plate (34',34") having first and second major surfaces (36',36") and (38',38"), the latter having a reflective coating (40',40") thereon. The optical plate (34',34") has a gradient index of refraction which increases from its first to its second major surface. As a consequence, the light entering the plate and reflected back therethrough is refracted so as to be bent closer to the plate normal (42',42"), causing the light leaving the mirror and entering the LCD cell to be well collimated, which is desirable for improving the display contrast.

8 Claims, 1 Drawing Sheet

GRADIENT INDEX MIRROR FOR PROVIDING A COLLIMATED BEAM FOR LIQUID CRYSTAL DISPLAYS AND THE LIKE

TECHNICAL FIELD

This invention relates to an improved mirror for use in a liquid crystal display for reflecting light through the display to improve the contrast of the information displayed by it.

BACKGROUND OF THE INVENTION

Many different types of electronic equipment utilize Liquid Crystal Displays (LCDs) for displaying information to allow a human operator to interface with such equipment. While the exact construction of such LCDs differs depending on their particular application, virtually all comprise a volume of liquid crystal material which, when subjected to an electrical field, changes its axis of polarization. A pair of polarizers are placed on opposite sides of the liquid crystal material so that the polarizers have their axes of polarization orthogonal to each other. In the absence of an electrical field, light passes through the first polarizer and then into the liquid crystal material which is arranged to change the axis of polarization of the light passing therethrough by 90°. The light beams are thus polarized by the liquid crystal material the same as the second polarizer so as to pass through it unimpeded.

However, when an electrical field is applied to the liquid crystal material, the material changes its axis of polarization. Thus, the light passing through the liquid crystal material is no longer polarized 90° so as to be aligned with the axis of the second polarizer. Instead, the light exiting the liquid crystal material is now polarized orthogonal to the axis of polarization of the second polarizer and is thus blocked thereby. By selectively confining the electrical field applied to the liquid crystal material, the amount of light that actually passes through the LCD can be controlled so that certain regions pass light while others do not. In this way, the LCD can be made to display an alphanumeric character or the like.

To improve the contrast of the information displayed by an LCD, backlighting is commonly used. Such backlighting is accomplished by placing a light source, e.g., a fluorescent lamp, behind the LCD (so that the lamp is adjacent to the LCD side opposite the side viewed by an operator). A reflector, typically a parabolic mirror, is placed behind the lamp to reflect and collimate the rays from the lamp, thereby yielding a collimated beam which is directed through the LCD. When fabricating the above-described backlit LCD, there is invariably a trade-off between the degree to which the display can be made small and the degree of sharp contrast obtained by increasing the curvature of the reflector placed behind the light source so as to increase the collimation of the beam directed through the LCD. Increasing the degree of curvature of the reflector increases the degree of collimation of the light reflected thereby, which is desirable, but at the expense of increasing the overall size of the display.

Thus, there is a need for a technique for backlighting an LCD display which allows the LCD to be made small and flat without diminishing the display contrast.

SUMMARY OF THE INVENTION

Briefly, in accordance with the present invention, a gradient index plate mirror is provided for reflecting light from a light source, placed behind a liquid crystal display (LCD), through the LCD in a substantially collimated beam so as to achieve high display contrast. The gradient index plate mirror of the invention comprises an optical plate having a first major surface opposite the LCD and a second, light-reflective major surface opposite the first surface. The plate has a gradient index of refraction which increases across its thickness from its first to its second major surface. Thus, as light beams enter the plate, the beams are refracted so as to be bent closer to the plate normal. By refracting the light beams closer to the plate normal, the gradient index plate mirror affords good collimation of the light beams reflected by the light-reflective second major surface through the LCD display to enhance the display contrast.

DETAILED DESCRIPTION

Figure 1:
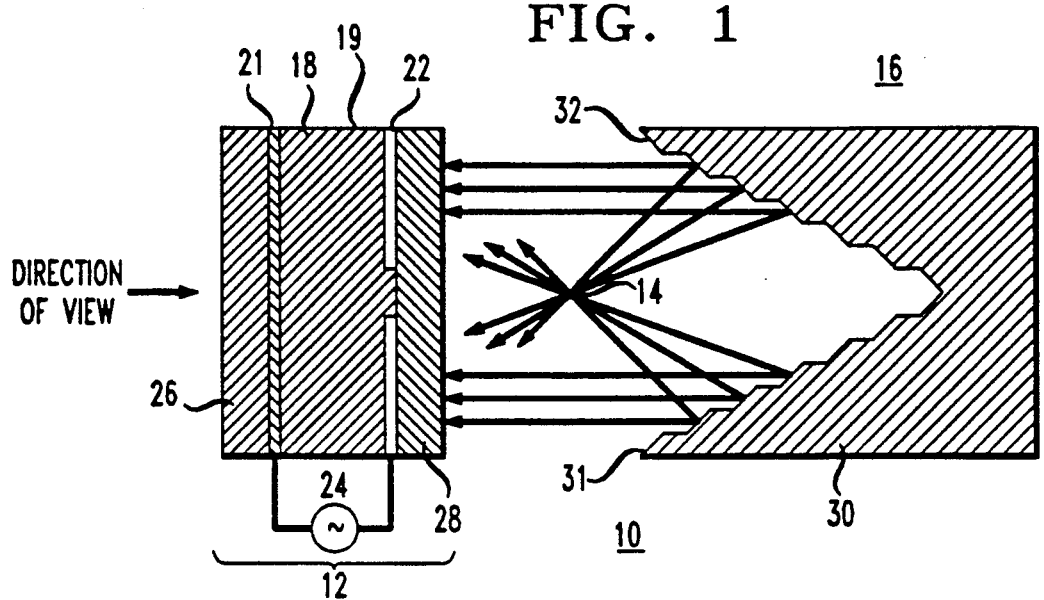
FIG. 1 is a side view, in cross section, of a prior art LCD which utilizes a faceted, parabolic-type mirror for reflecting light through the LCD.

FIG. 1 is side view, in cross section, of a Liquid Crystal Display (LCD) 10 according to the prior art. The LCD 10 comprises an LCD cell 12 whose details are described below. A light source 14 is located behind the cell 12 (i.e., to the right of the cell in FIG. 1) so as to direct light in a leftward direction opposite to the direction of view. A parabolic mirror 16 is located behind of the light source 14 (i.e., to the right of the light source in FIG. 1) to reflect light from the light source through the LCD cell 12.

The LCD cell 12 is comprised of a volume 18 of liquid crystal material held in a light-transmissive enclosure 19. The volume 18 of liquid crystal material is selected to exhibit the property of optical birefringence, i.e., the ability to change polarization states in response to the application of an electrical field. The enclosure 19 containing the volume 18 of liquid crystal material is disposed between a pair of electrodes 21 and 22. The electrode 21 is typically formed of a light-transmissive metallic film, such as titanium dioxide or the like, which is applied to the forward, (i.e., left-hand) face of the enclosure 19. The thickness of the electrode 21 has been exaggerated in FIG. 1 for purposes of illustration. The electrode 22, which is juxtaposed to the rear (i.e., right-hand face) of the enclosure 19, is fabricated of a plurality of individual segments, each made of an opaque, electrically conductive metal or metal alloy, so as to represent a separate segment of an alphanumeric character or another symbol. Each of the electrodes 21 and 22 is coupled to a separate one of a pair of terminals of a source of electrical potential 24.

First and second optical polarizers 26 and 28 are juxtaposed to the front and rear (i.e., to the left and right) of the electrodes 26 and 28, respectively. Each of the polarizers 26 and 28 serves to polarize the light passing through it by changing the axis of polarization of the incident light by 90°. The polarizers 26 and 28 are oriented so that their axes of polarization are orthogonal to each other.

In practice, the molecules in the volume 18 of liquid crystal material are oriented the same as the axis of polarization of the polarizer 26. Light beams, which are directed leftward through the polarizer 28 are polarized in a first orientation. In the absence of an electrical field being applied across the volume 18 of liquid crystal material, the light beams passing through the material have their polarization rotated 90° to correspond to the axis of polarization of the polarizer 26 and thereby pass through the polarizer unimpeded. Thus, in the absence of an electrical field applied across the volume 18 of liquid crystal material, the LCD cell 10 appears light transmissive.

Once an electrical potential is applied to the electrodes 21 and 22 so that an electrical field is applied across the volume 18 of liquid crystal material, the axis of polarization of the material now changes so as to correspond to that of the polarizer 28. As light beams pass from the polarizer 28 into the volume 18 of liquid crystal material, the polarization of the light exiting the material is now orthogonal to the polarization axis of the polarizer 26. Thus, the light beams exiting the volume 18 of liquid crystal material are blocked by the polarizer 26, making the LCD cell 12 appear opaque. By confining the electrical field to certain regions of the material 18 of liquid crystal material, through energizing selected segments of the electrode 22, selected portions of the LCD cell 12 can be made to appear opaque to display an alphanumeric character, or some other symbol or image.

The contrast of the display afforded by the LCD cell 12 in the manner described above is increased when the lamp 14 located behind the cell is illuminated. In practice, the lamp 14 comprises one or more fluorescent or incandescent lamps. The curved mirror 16 is typically comprised of a block 30 whose forward (i.e. left-hand) face 31 is light-reflective. A plurality of facets 32 are cut into the face 31 so as to increase in depth from the top and bottom to the center of the face to cause it to have a curvature resembling a generally parabolic shape. In this way, the mirror 16 serves to reflect and collimate light from the lamp 14 through the display 12 to increase the display contrast.

By making the depth of the facets 32 of the mirror 16 increasingly greater towards the center from each of the edges of the mirror (so as to increase its effective curvature), the degree of collimation can be increased, which is desirable. However, increasing the depth of the facets 32 requires that the block 30 be made thicker, increasing the overall size of the LCD 10, which is undesirable. Thus, with the prior art LCD cell 10, there exists a trade-off between the degree of contrast which can be obtained by collimating the light through the cell 12 with the mirror 16 and the degree to which the size of the display can be made small. A smaller display is desirable from the point of view of portability, size and weight of the final product incorporating the display.

Figure 2:
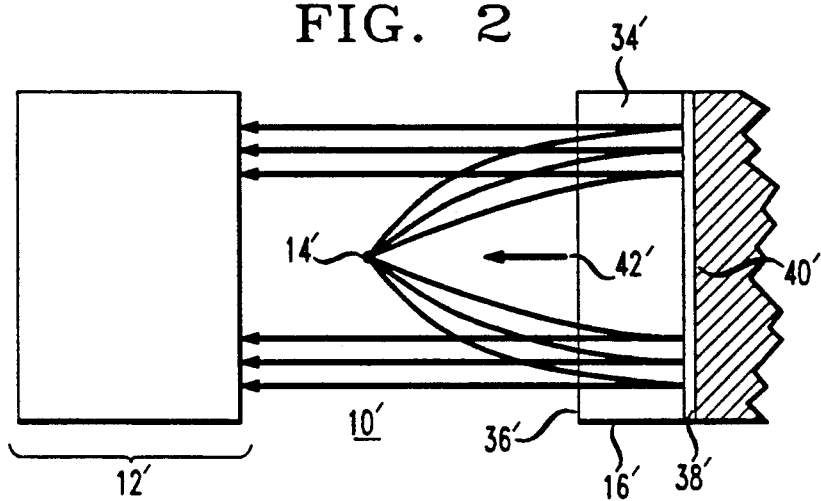
FIG. 2 is a side view, in cross section, of an LCD incorporating a gradient index plate mirror in accordance with a first preferred embodiment of the invention.

The foregoing disadvantage associated with the LCD 10 of FIG. 1 is overcome by the LCD 10' of FIG. 2 which is constructed in accordance with the present invention. The LCD 10' is comprised of a LCD cell 12' configured identically to the cell 12 of FIG. 1. Behind the cell 12' is a lamp 14', identical to the lamp 14 of FIG. 1. Like the LCD 10 of FIG. 1, the LCD 10' of FIG. 2 also includes a mirror 16' located behind the lamp 14'. However, unlike the mirror 16 of FIG. 1 which is generally parabolic in shape, the mirror 16' of the LCD 10' of the present invention advantageously takes the form of a flat gradient index plate mirror comprised of a plate 34' of optical material, e.g., glass or plastic. The plate 34' has a first major surface 36' facing the LCD cell 12' and a second, opposite major surface 38' which is made light reflective by a thin layer of silver 40' or a similar light-reflective coating or material.

The plate 34' is fabricated so as to have a gradient index of refraction which increases across the plate thickness from the first major surface 36' to the second major surface 38'. In this way, the light beams from the lamp 14' which enter the plate, and are reflected back through it by the reflective coating 40', are refracted by the plate so as to be bent closer to a line 42' which is normal to the surface 36'. The light beams are refracted in such a manner that they reach the surface 38' at a nearly normal incidence. Accordingly, the light beams reflected by the mirror 16' of the invention exit the mirror substantially parallel to the plate normal 42' so as to be well collimated as they pass through the LCD cell 12', which is very desirable as it aids in increasing the display contrast.

The advantage of configuring the mirror 16' as a gradient index mirror is that the plate 34' can be made flat and also relatively thin, and still achieve very good collimation as compared to the block 30 of the curved mirror 16 of FIG. 1. In this way, the LCD display 10' can be made small without sacrificing display contrast.

Figure 3:
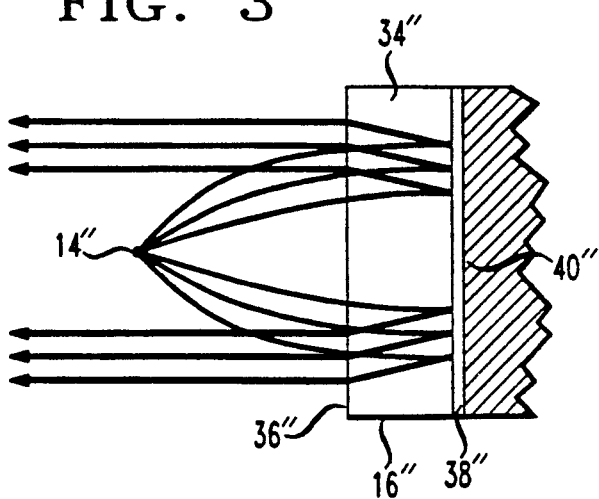
FIG. 3 is a side view in cross section of an alternate preferred embodiment of a gradient index plate mirror according to the invention.

Referring now to FIG. 3, there is shown an alternate preferred embodiment 16" of a gradient index mirror in accordance with the present invention. The mirror 16" is configured of an optical plate 34" having a first major surface 36" and a second major surface 38", the second surface coated with a reflective coating 40". Like the plate 34' of the mirror 16' of FIG. 2, the plate 34" of the mirror 16" of FIG. 3 has a gradient index of refraction which increases from its first major surface 36" to the second major surface 38". Additionally, the index of refraction of the plate 34" of FIG. 3 is also made to increase laterally across its bulk from its center to each of its outer edges.

By fabricating the plate 34" so as to have a gradient index laterally across its bulk, a beam striking the reflective coating 40" on the major surface 38" at a nearly normal incidence angle will be subjected to a decreasing outward index of refraction and an increasing lateral index of refraction at the same time along its direction of travel away from the reflective coating. As a result, the beams reflected from the reflective coating 40" experience a marginal spatial displacement through the plate 34" and emerge from the first major surface 36" nearly parallel to the plate normal 42". In this way, the beams exiting the mirror 16" are well collimated which, as discussed earlier, enhances the contrast of the LCD (not shown in FIG. 3).

The foregoing describes preferred and alternate preferred embodiments 16' and 16" of a gradient index plate mirror for reflecting light through an LCD cell 12' in a well-collimated beam to increase the display contrast while affording the ability to make the overall display small.

It is to be understood that the above-described embodiments are merely illustrative of the principles of the invention. Various modifications and changes may be made thereto by those skilled in the art which will embody the principles of the invention and fall within the spirit and scope thereof.

I claim:

1. For use with an optical or imaging system or the like, a mirror reflecting light incident on the mirror through the system in a well-collimated beam comprising:

an optical plate having a first major surface opposite the system and a second major surface opposite the first surface and distant from the system;

the second major surface being light-reflective for reflecting light striking the surface; and the plate having a gradient index of refraction which increases from its first to its second major surface so that light which is passed through the plate while being refracted strikes the reflective coating on the second major surface and is reflected back through the plate to exit the plate in a collimated fashion.

2. The mirror according to claim 1 wherein the plate has a gradient index of refraction which increases laterally through the bulk of the plate from its center to each of its edges.

3. The mirror according to claim 1 wherein the second major surface has a light-reflective coating of silver.

4. In combination with a liquid crystal display cell, one or more light sources placed behind the cell to reflect light therethrough, and a mirror placed behind the lamp(s) to reflect and collimate the light from the lamp(s) through the cell, the improvement wherein:

the mirror is formed of an optical plate having a first major surface opposite the lamp and a second major surface distant therefrom;

the plate having a light-reflective coating on its second major surface for reflecting light striking the surface; and the plate having a gradient index of refraction which increases from its first to its second major surface so the light which is passed through the plate while being refracted strikes the reflective coating on the second major surface and is reflected back through the plate to exit the plate in a collimated fashion.

5. The mirror according to claim 4 wherein the plate has a gradient index of refraction which increases laterally through the bulk of the plate from its center to each of its edges.

6. The mirror according to claim 5 wherein the light-reflective coating comprises a layer of silver.

7. A method for reflecting light through a liquid crystal cell comprising the steps of:

providing a gradient index plate mirror formed of an optical plate having a first major surface opposite the lamp and a second major surface distant therefrom, the plate having a light-reflective coating on its second major surface for reflecting light striking the surface; and the plate having a gradient index of refraction which increases from its first to its second major surface;

positioning the plate behind a light source itself positioned behind the liquid crystal cell so that light from the light source enters the optical plate and strikes the light-reflective coating on the second major plate surface; and refracting the light entering the plate by an increasing amount as the light passes through the plate in a first direction towards the light-reflective coating, and refracting the light reflected by the light-reflective coating back through the plate in a second direction by a decreasing amount such that the return path is closer to a line normal to the first major surface of the plate, thereby causing the light exiting the mirror to be well collimated.

8. The method according to claim 7 wherein the optical plate also has a gradient index of refraction which increases laterally from its center to each of its outer surfaces.

* * * * *